Figure 1:
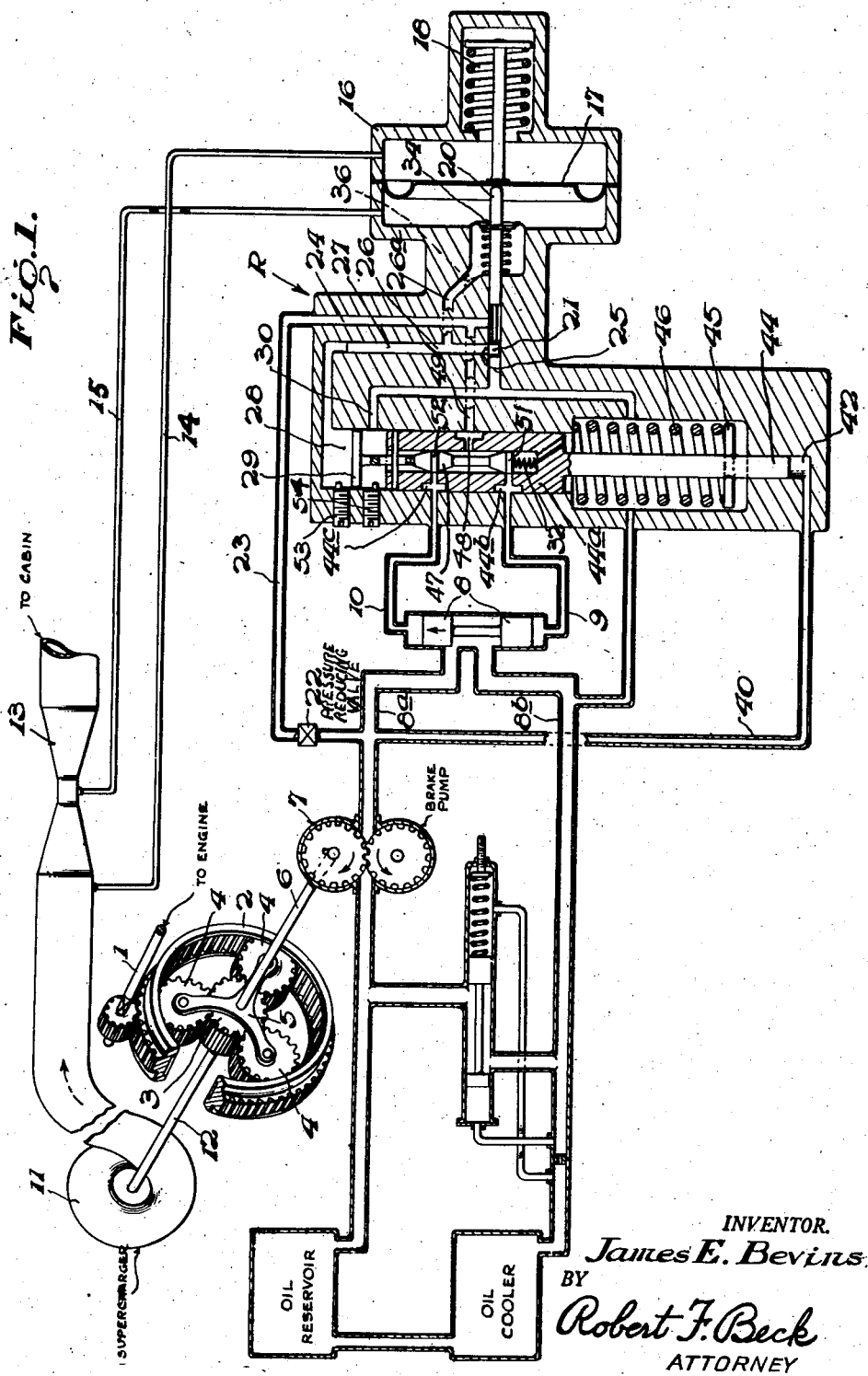

July 2, 1946.  J. E. BEVINS  2,403,332
REGULATOR
Filed July 18, 1944  2 Sheets-Sheet 2

INVENTOR.
James E. Bevins.
BY
Robert F. Beck
ATTORNEY

Patented July 2, 1946

2,403,332

UNITED STATES PATENT OFFICE 2,403,332

REGULATOR

James E. Bevins, Hackensack, N. J., assignor to Bendix Aviation Corporation, Teterboro, N. J., a corporation of Delaware Application July 18, 1944, Serial No. 545,491

8 Claims. (Cl. 230—11)

This invention relates to supercharger regulators and particularly to supercharger regulators for aircraft cabins.

In the operation of aircraft, particularly at high altitudes, it is customary to provide the aircraft with a sealed cabin and to supply the cabin with air in such a manner that the pressure and rate of flow of the air to the cabin is controlled at all times.

One of the objects of the present invention is to provide a regulator to maintain a predetermined rate of flow of air to the cabin at any altitude and at any engine speed between cruising and maximum R. P. M.

Another object of the present invention is to provide a regulator so constructed and arranged as to automatically render the supercharger highly responsive to changing conditions while at the same time infallibly retaining full stability of control.

Another object of the invention is the provision of the lightest possible reliable device, which utilizes the balancing of opposing forces and the use of follow-up pressures instead of distances.

An important object of the invention is to provide a regulator of the foregoing described character which is so constructed and arranged as to constantly maintain a desired rate of flow of air to the cabin through the medium of pressure-sensitive elements.

Another important object of the invention is to provide a regulator of the foregoing described character which is equipped with means for preventing the maintenance of excessive rates of flow of air to the cabin.

A further object of the invention is to provide a regulator of the foregoing described character which is simple in construction, durable in use, efficient in operation, economical in manufacture, relatively light in weight and extremely compact as to size.

Other objects and advantages will be apparent from a perusal of the specification, a study of the claims and an inspection of the annexed drawings.

Figure 2:
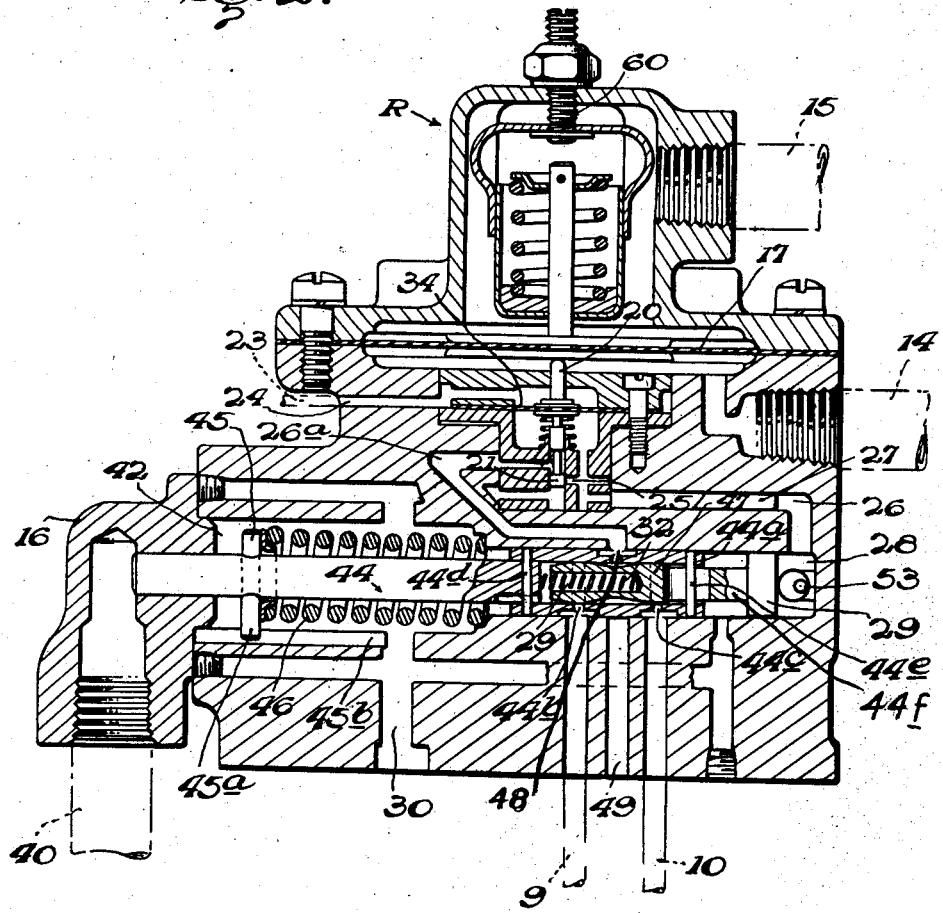

Referring to the drawings, wherein like reference characters designate like parts throughout the several views:

Figure 1 somewhat diagrammatically shows, partially in sectioned elevation, the regulator and the engine-driven supercharger which it controls;

Figure 2 is a sectional elevation through the regulator itself as preferably constructed.

As illustrated in Figure 1 of the drawings, I provide a driving system wherein an engine shaft 1 drives the external ring gear 2 of a planetary drive having a sun gear 3 driven by planet gears 4 pivoted on a spider 5. A shaft 6 connects the spider 5 with a gear in a gear pump brake 7 which, when its flow is throttled, imposes a driving torque which is proportional to the differential pressure across the pump. The driving system, including the hydraulic circuit shown, is disclosed and claimed in U. S. application for Letters Patent, Serial Number 421,082, filed November 29, 1941, and which system contains a throttling piston valve 8 to whose cylinder ends are connected pressure lines 9 and 10 which, when blocked, hydraulically lock the piston valve 8 in a throttling position securely even though valve 8 sets up a pressure drop of over 1000 p. s. i. between high and low pressure sides 8a and 8b, respectively. An increase in the air flow and hence of the Venturi pressure differential beyond a set value requires that main valve 8 move in the direction of the arrow in Figure 1, to decrease the driving torque on the blower.

As also disclosed in the aforementioned application, a supercharger or blower 11 is driven by the sun gear 3 through the medium of a shaft 12. Air drawn from the atmosphere by the blower 11 is discharged through the venturi 13. The venturi's inlet and throat pressure lines 14 and 15, respectively, carry the pressure differential to the casing 16 of the regulator R where it acts upon a diaphragm 17 with a force which is opposed by a spring 18.

The outer end of a rod 20 abuts, and hence moves with, the diaphragm 17, while a pilot valve 21 is attached to the inner end of rod 20 to move in unison with the diaphragm 17. Oil under a substantially constant pressure of, e. g., 100 p. s. i. is supplied from the hydraulic circuit by a pressure-reducing valve 22, supply line 23, and passage 24 in the casing 16 to the side of pilot valve 21 adjacent the diaphragm 17. A governing-pressure port 25 is substantially covered by the pilot valve 21, when the latter is in its normal regulating position, and communicates with a passage 26 in which is disposed a throttling plug 27. Said passage 26 pressure-connects the port 25 with a cylinder 28 for piston member 29 to apply the pilot-governed pressure to the upper end of the piston member (as viewed in Figure 1), the other end being exposed to the suction pressure of the hydraulic circuit, which is at nearly atmospheric pressure, by the drain passage 30. A spring 32 abuts the lower end of the member 29 and has a definite length when compressed under the normal governing pressure. A passage 26a carries this pressure to the side, adjacent the valve 21, of a small flexible sealing diaphragm 34 which is attached to the rod 20 to provide a pressure follow-up which helps to provide a definite normal governing pressure and also, regardless of ordinary changes of the supply pressure, strongly tends to stabilize the pilot valve itself. A bead restriction 36 may be inserted in passage 26a to provide an additional stabilizing effect which, however, is ordinarily not required for such regulated systems.

The high pressure side of the hydraulic circuit is connected by a pressure line 40 with a cylinder 42 in which is disposed a plunger member 44, the latter being pierced, at one end, by pin 45 which is abutted by a spring 46 whose other end is fixed. The member 44 thus has a definite position for each braking pressure and hence for each driving torque.

The opposite end of the member 44 is formed with a cylindrical sleeve 44a which is provided with ports 44b and 44c for cooperation with a relay valve 47 which is a portion of the piston member 29. A passage 49 carries oil under the full supply pressure to a central opening 48 while ports 44b and 44c communicate with pressure lines 9 and 10, respectively, for the servo-operation of the main control valve 8, as earlier described. The relay valve 47 has lands 51 and 52 respectively substantially covering ports 44b and 44c when the relay valve is in its neutral position, thus hydraulically locking valve 8 in a throttling position.

Adjacent the member 29, the casing is provided with adjustable eccentric stud-pins 53 and 54 which limit the travel of the piston member 29 and hence also the working range of the hydraulic braking pressure.

The description thus far applies strictly to the structure diagrammatically illustrated in Figure 1. It also generally applies to Figure 2 which shows the preferred construction that differs in several details as mentioned below. In Figure 2, a screw 60 is provided to alter the setting of the Venturi differential, an adjustment not shown in Figure 1. In Figure 2, the plunger-piercing pin 45 is shown as being provided with a depending extension 45a which is slidably mounted in a longitudinal guide slot 45b formed in the casing 16 to maintain the plunger 44 and its several ports against rotation, thereby insuring registry with their respective passages. The plunger member 44 is shown in Figure 2 to have its sleeve 44a attached thereto by means of a pin 44d. The sleeve 44a carries a pin 44e which extends through an elongated slot 44f formed in the stem of piston member 29 to facilitate assembly and permit relative sliding movement therebetween.

The operation of the regulated system is as follows, reference being had to Figure 1.

When normally regulating at the set Venturi differential, the main valve 8 is locked in the throttling position suitable for the engine speed, atmospheric condition and tightness of aircraft cabin. For this locking, the relay valve 47 is neutralized relative to the ports 44b and 44c in the sleeve end of the member 44. The pilot valve 21 is also steadily in its normal position closing the port 25 and the normal governing pressure acts on the sealing diaphragm 34 to produce a standard force partially balancing that due to the Venturi differential acting on the diaphragm 17 with the result that a lighter spring 18 is used than would otherwise be adequate.

Upon an increase of the flow due to, e. g., a sudden increase in cabin leakage-area, the increased Venturi differential forces to the left both diaphragm 17 and pilot valve 21 to partially uncover the port 25 and increase the governing pressure until such pressure creates a sufficient increase of the force on the sealing diaphragm 34 to nearly restore the pilot valve 21 to its normal position. In the meantime, the increased governing pressure has forced the relay valve 47 towards the port 44b to partially uncover port 44c to drain and port 44b to the oil supply, thus actuating main valve 8 in the direction towards the line 10 to decrease the braking pressure, driving torque, and air flow. Thus the Venturi differential is affected in the direction to restore it to the set value. As the brake-pressure decreases, plunger 44 is actuated by its spring 46. This moves the sleeve containing ports 44b, and 44c in a direction to gradually neutralize the relay valve 47 and bring the main valve 8 asymptotically to its new equilibrium throttling position.

From the foregoing, it will be clear that a decrease of the Venturi differential will cause regulator changes in the opposite direction: pilot valve 21 is slightly actuated toward the diaphragm 17, the relay valve 47 is moved towards the pins 53 and 54, followed in that direction by the plunger 44, main valve 8 is squeezed towards the opposite direction, with a gradual increase of the speed of the blower until the set value of Venturi differential is again reached.

In following through the operation above, it is apparent that each regulator element in turn is stabilized before the next acts fully: the relay valve 21 is stabilized by the pressure follow-up acting on the diaphragm 34 before the piston 29 acts fully, the piston 29 being retarded by the damping plug 27. Likewise, the piston 29 and the relay action are stabilized by the pressure follow-up acting on the plunger 42 so that the main control valve 8 is haltered while the blower speed is changing, the blower's moment-of-inertia acting to slow the rate of change of the blower speed.

These refinements make possible an extreme reduction of size of the parts, pilot valve 21 having a length and diameter of less than one-sixteenth inch and with a dead-zone of less than 0.0005 inch. A further important reduction of size and weight results from the telescoping of the parts of the relay. Also, in this generally proportional follow-up arrangement, the resetting action, or elimination of droop or load-error, is provided with a minimum of mechanism, simply by the fact that cylinder 28 permits piston 29 and the port-sleeve of the member 44 to take any required position to exactly restore the Venturi differential precisely to its set value. Thus adequate performance, as regards reliability, accuracy and stability of regulation, is provided with a striking reduction of size and weight along with complete elimination of trappy links, levers and other mechanical or kinetic follow-up devices which are sensitive to the vibration, jarring and the like which occurs in aircraft operation.

While only one embodiment of the present invention has been shown in the drawings, it is to understood that various changes may be made in the construction thereof without departing from the scope of the invention and, for this reason, it is intended not to limit the invention by the description herein given as an example, but solely by the scope of the appended claims, noting that any differential producer is an equivalent to the venturi noted in the preamble and that the pump-braked drive may be replaced by any other suitable hydraulic motor.

I claim:

1. A regulator for flow through a venturi from a blower which is driven with the torque governed by a hydraulic-pressure device, comprising a control valve for the hydraulic fluid, a servomotor positioning said valve, a relay for said servomotor, means including a pilot means for maintaining a governing pressure for said device proportional to the Venturi differential, a means including a spring and a piston having the piston movement proportional to the hydraulic pressure and hence to the driving torque, and a follow-up means connecting the relay with both the other means to correspondingly operate the relay upon a change in either said governing pressure or the position of said piston, said follow-up means including a reset means to gradually destroy the stated correspondence, whereby, upon a sudden change of the flow through the venturi, there is a sudden proportional change in the corresponding governing pressure and an actuation of the relay and of the reset means to produce a quick proportional change of the hydraulic pressure followed by a slow further change in the same direction.

2. In a regulator for flow through a venturi from a blower which is driven with the torque governed by a hydraulic-pressure device, for a system including a control valve for the hydraulic fluid and a servomotor positioning the valve, the combination of means including a pilot means for maintaining a governing pressure for said device proportional to the Venturi differential, a means including a first spring and a plunger having a movement proportional to the hydraulic pressure and hence to the driving torque, a second spring, a movable piston member axially aligned with and abutting said second spring and having one side pressure-connected with the governing pressure to proportionally compress said second spring, and a relay couple for the servomotor having one element positioned by said plunger and the other by said piston member, said plunger being axially aligned with said piston member and also abutting said second spring, whereby the relative movement of the relay couple elements following a sudden change of the Venturi differential initially depends upon both said governing and hydraulic pressures and ultimately depends only upon said governing pressure.

3. The combination set forth in claim 2 including a pressure follow-up for the pilot means arranged to oppose the action of the Venturi differential upon the pilot means.

4. An instrument for regulating a first pressure to a predetermined normal value in a system in which a valve controls the flow of a fluid accompanied by a second pressure which affects said first pressure which is to be regulated, comprising a diaphragm acted upon by the first pressure to set up a proportional force, a spring acted upon by the diaphragm tending to convert the force into a proportional movement, a pilot valve moved by said diaphragm to set up a governing pressure proportional to said movement, a second diaphragm acted upon by the governing pressure and connected with the first diaphragm to oppose it to act as a pressure follow-up, a piston member, a passage connecting the pilot valve with one side of the piston member, a relay valve portion of said piston member, a ported sleeve for the relay valve with the ports located to be closed by the relay valve when the latter is in a neutral position, a spring between the relay valve and its sleeve to oppose the piston and provide a definite predetermined governing pressure and a plunger acted upon by the controlled second pressure which affects that on the first-named diaphragm, said plunger being connected with said sleeve, whereby a sudden change of the first-named pressure results in a momentary movement of the relay valve in a corresponding direction and a following movement of the sleeve to provide an early rapid but haltered movement of the control valve in the proper direction to tend to neutralize the stated sudden change following by an asymptotic approach to a new final position of the control valve which accurately restores the first-named pressure to its set normal regulating value.

5. In an instrument for regulating, precisely to a predetermined normal value, a physical variable in a system in which a valve controls a pressure which, in a retarded manner, affects the physical variable, the combination of a first means for setting up a governing pressure proportional to the value of the physical variable to be regulated including a follow-up proportional to the value of the governing pressure, a piston member having the governing pressure act on one end, a second means including a plunger for setting up a movement of said plunger proportional to the pressure which affects the value of the physical variable, a servo including a servomotor and a relay couple for the servomotor having one element connected with said piston member and the other with said plunger, one of the elements being a double-land piston valve and the other a sleeve having two ports which are substantially covered by the bands with said piston valve in its neutral position, and a spring connecting said elements to allow relative movement and to predetermine the normal governing pressure in coaction with the piston member area.

6. In an instrument for governing a controller for the flow of a control agent affecting a physical variable to be measured and regulated in a plant in which inertia appreciably retards the response of the value of said variable to a change in the flow-rate of said control agent, the combination of two hydraulic servos in series between the meter and the controller, a stabilizing means for the first servo consisting of a diaphragm connected to its relay valve and a hydraulic follow-up from its relay valve's governed hydraulic pressure to said diaphragm, a hydraulic-flow restriction in the connection of the first servo's relay valve to its servomotor to retard the action of the latter and hence of the last servo's relay valve to provide a substantially asymptotic approach to a new steady position of the latter, and a pressure follow-up from the controlled agent to the last servo's relay valve for substantially reducing an effect of the stated inertia which would otherwise strongly tend to produce instability, whereby following a sudden change of the measurement which governs the first servo, the first servo tends to asymptotically approach and substantially reach a new steady condition before the controller does, to thus provide stable regulation.

7. The combination set forth in claim 6 in which the diaphragm is resilient and the combination includes a hydraulic-flow restriction in the connection between the first servo's relay valve and its diaphragm whereby, upon a sudden change of the value of the measured variable and due to the haltered follow-up, the first servo's relay valve moves quickly beyond the final position which it subsequently asymptotically approaches.

8. A regulator for flow through a venturi from a blower, the speed of which is controlled by a hydraulic-pressure device, comprising means for maintaining a value of a fluid pressure proportional to the Venturi differential, a spring-and-piston for creating a deflection of said spring proportional to said fluid pressure, means including a second spring-and-piston for creating a movement of the second piston proportional to the hydraulic pressure, a control valve for the hydraulic fluid, a servomotor floatingly positioning said valve, and a relay for said servomotor, said relay having two relatively movable parts with one positioned by the second-named piston and the other by that first-named, the arrangement being such that the first-named spring constitutes a resilient operative connection between the first-named relay-part and the first-named piston, whereby the relay is correspondingly operated by either of said pistons upon a movement thereof and the fluid pressure means acts as a reset means which gradually destroys the stated correspondence so that, upon a sudden change of the flow through the venturi, there is a sudden proportional change in the corresponding stated value and an actuation of the relay and of the reset means to produce a quick proportional change of the hydraulic pressure followed by a slow further change thereof in the same direction.

JAMES E. BEVINS.